(12) United States Patent
Kilburn et al.

(10) Patent No.: US 6,524,182 B2
(45) Date of Patent: Feb. 25, 2003

(54) KIT PROVIDING MEANS FOR MITIGATING RADON FROM A DWELLING

(75) Inventors: Jack M. Kilburn, Blanchester, OH (US); John L. Kilburn, Sr., Clarksville, OH (US); William L. Stidham, Morrow, OH (US)

(73) Assignee: Mitigator, Inc., Blanchester, OH (US)

( * ) Notice: Subject to any disclaimer, the term of this patent is extended or adjusted under 35 U.S.C. 154(b) by 0 days.

(21) Appl. No.: 09/952,429

(22) Filed: Sep. 14, 2001

(65) Prior Publication Data

US 2002/0006774 A1 Jan. 17, 2002

Related U.S. Application Data

(63) Continuation-in-part of application No. 09/513,791, filed on Feb. 25, 2000.
(60) Provisional application No. 60/121,722, filed on Feb. 26, 1999, and provisional application No. 60/138,823, filed on Jun. 14, 1999.

(51) Int. Cl.[7] .................................................. F24F 7/06
(52) U.S. Cl. ........................ 454/354; 454/341; 454/909
(58) Field of Search ................................ 454/341, 343, 454/345, 909, 354, 356, 350, 351

(56) References Cited

U.S. PATENT DOCUMENTS

| 1,924,489 | A | * | 8/1933 | Ferris ........................... 454/351 |
| 4,798,034 | A | * | 1/1989 | Jarnagin et al. ............. 454/344 |
| 4,885,984 | A | * | 12/1989 | Franceus ..................... 454/341 |
| 4,902,315 | A | * | 2/1990 | Spicer ......................... 454/238 |
| 4,957,394 | A | * | 9/1990 | Jarnagin et al. ......... 405/128.2 |
| 5,294,049 | A | * | 3/1994 | Trunkle et al. ......... 454/351 X |

* cited by examiner

Primary Examiner—Harold Joyce
(74) Attorney, Agent, or Firm—Neal O. Willmann

(57) ABSTRACT

A kit for reducing the level of radon in a dwelling. Containing a rain-proof exhaust vent hood housing an axial fan, and a suction pipe attached to a length of flex-duct. The kit can be easily installed by most homeowners. The installer simply cuts a hole in the band-board atop the foundation wall of the dwelling, inserts the assembled vent hood and suction pipe in the band-board opening, attaches the proximal end of a length of flex-duct and positions the distal end of the flex-duct into a de-pressurization point in the dwelling. An existing sump pump well or drain tile field can serve as a de-pressurization point.

2 Claims, 3 Drawing Sheets

KIT PROVIDING MEANS FOR MITIGATING RADON FROM A DWELLING

CROSS REFERENCE TO RELATED APPLICATIONS

This application claims the benefit of U.S. Provisional Application No. 60/121,722 filed Feb. 26, 1999; and No. 60/138,823 filed Jun. 14, 1999 and U.S. patent application Ser. No. 09/513,791 filed Feb. 25, 2000.

BACKGROUND OF THE DISCLOSURE

Typically, the mitigation or the reduction of radon levels in a dwelling involves installing an expensive array of piping running from a sub-slab, block wall, or crawl-space membrane de-pressurization point, and then up through the floors, ceilings and roof of a dwelling where the radon enriched air is exhausted. This involved and laborious installation involves cutting several holes within the dwelling to accommodate the new piping. Then, a new electrical outlet and a special sealed fan are installed in the attic to exhaust through a newly flashed opening in the roof. This is followed by cosmetic modifications. to accommodate the new piping. Finally, patching and painting are needed to complete the job. Then, once activated, this system creates a negative pressure within the soil, beneath and/or around the dwelling, draws radon gas from this area through the de-pressurization point and exhausts through the new pipe and fan, ultimately venting the radon-enriched air through the roof When vented to the outside, of course, the radon is rapidly diluted to a harmless level. These systems are typically very expensive, due to the cost of the labor, pipe, fan and other modifications to the dwelling.

This disclosure relates specifically to an inexpensive kit permitting the evacuation of radon gas that has accumulated, and will accumulate, in dwellings located in a significantly large area of the United States. This kit will work in the same fashion as the expensive systems presently in use but will save the expense and disruption associated with present methods, thereby making it affordable for everyone to remove deadly radon gas from his house. In particular, the disclosed method and means provide an affordable kit for the homeowner to install. The kit consists of a readily available axial fan (typically like one used to cool PCs) with a rain-proof exhaust vent hood and a suction pipe attached to a length of flex-duct. The disclosed method will utilize the same de-pressurization points as present systems; however, most installations will take advantage of the natural tendency of radon to concentrate in the sump, crock and /or drain tile of a dwelling.

Installing the disclosed kit is as simple as: cutting a hole in the band-board or other exterior wall location above and near the de-pressurization point (typically an existing sump pit or existing drain tile) but not within ten feet of any outside air intakes, such as windows or doors; sliding the attached flex-duct, fan, vent hood and suction pipe into the hole from the outside until the vent hood meets and stops at the exterior wall veneer; caulking between the vent hood and new hole; inserting the flex-duct into a de-pressurization point; sealing any openings between the soil and the dwelling, (e.g., cracks in the basement walls or floor, drain pipe openings, sump lid openings, and the like); plugging the fan unit into an outlet; and verifying that the newly installed system is operating by feeling to see that air is exiting through the exterior vent hood. A radon test should then follow to determine the new radon level.

Once activated, the fan creates the necessary negative pressure within the soil beneath and/or around the dwelling in the same fashion as the present systems. Then the new kit draws radon gas out through a conventional de-pressurization point by way of the new flex-duct which is attached to the newly designed exterior axial fan/vent hood combination and exhausts the radon enriched air through the band-board or exterior wall of the dwelling. When vented to the outside, of course, the radon is rapidly diluted to a harmless level.

DESCRIPTION OF THE PRIOR ART

Among the many patent references that teach and disclose methods and devices for reducing the level of radon gas in a dwelling is U.S. Pat. No. 4,798,034, which issued Jan. 17, 1989 to Jarnagin et al. The '034 reference relates to an apparatus and method for collecting radon gas and fluids, primarily from the periphery of a subterranean enclosure, and for discharging the collected fluids and radon gas to the exterior of the enclosure. The apparatus and method create a sealed system around the inside perimeter of the subterranean enclosure, and a lower ambient air pressure created in the system facilitates the collection of radon gas and fluids therein. The radon gas and fluids separate and the system disposes of them separately. Another reference of interest is U.S. Pat. No. 4,902,315, which issued Feb. 20, 1990 to Spicer. This patent is directed to the removal of airborne particulate contaminants (asbestos) from a work area, using a manifold and ducting assembly.

In contrast, the disclosed system avoids the expense and disruption associated with prevailing methods, thereby making radon mitigation universally affordable. Indeed, our intention in bringing this invention to the public is to encourage the mitigation of radon gas by providing an easily-installed, affordable kit to the public, not just mitigation contractors.

SUMMARY OF THE INVENTION

Notwithstanding the disclosures of the prior art, which provides numerous suggestions for means and methods of mitigating radon in a dwelling, there remains a need to provide an affordable, easy to install kit, which, when assembled, will effectively remove and/or diminish the radon from the confines of a dwelling. More particularly, the kit comprises a suction pipe having interior and exterior openings relative to the dwelling; an exhaust vent hood attached to the pipe near the exterior opening to shield the opening, said hood housing an axial fan; and a length of flex-duct sufficient to extend from the interior opening of the suction pipe to a de-pressurization point in the dwelling.

The installation of the disclosed kit is intended to proceed easily and without complication, especially in a dwelling having a subterranean foundation with a de-pressurization point and a band-board juncture between the foundation and superstructure of said dwelling. Specifically, the method comprises boring a hole in the band-board; inserting in the band-board hole, a suction pipe having interior and exterior openings relative to the dwelling; attaching an exhaust vent hood, housing an axial fan, near the exterior opening of said pipe, to shield said opening; and connecting a length of flex-duct sufficient to extend from the interior opening of the suction pipe to a de-pressurization point in the dwelling.

DESCRIPTION OF THE PREFERRED EMBODIMENT

Figure 1:
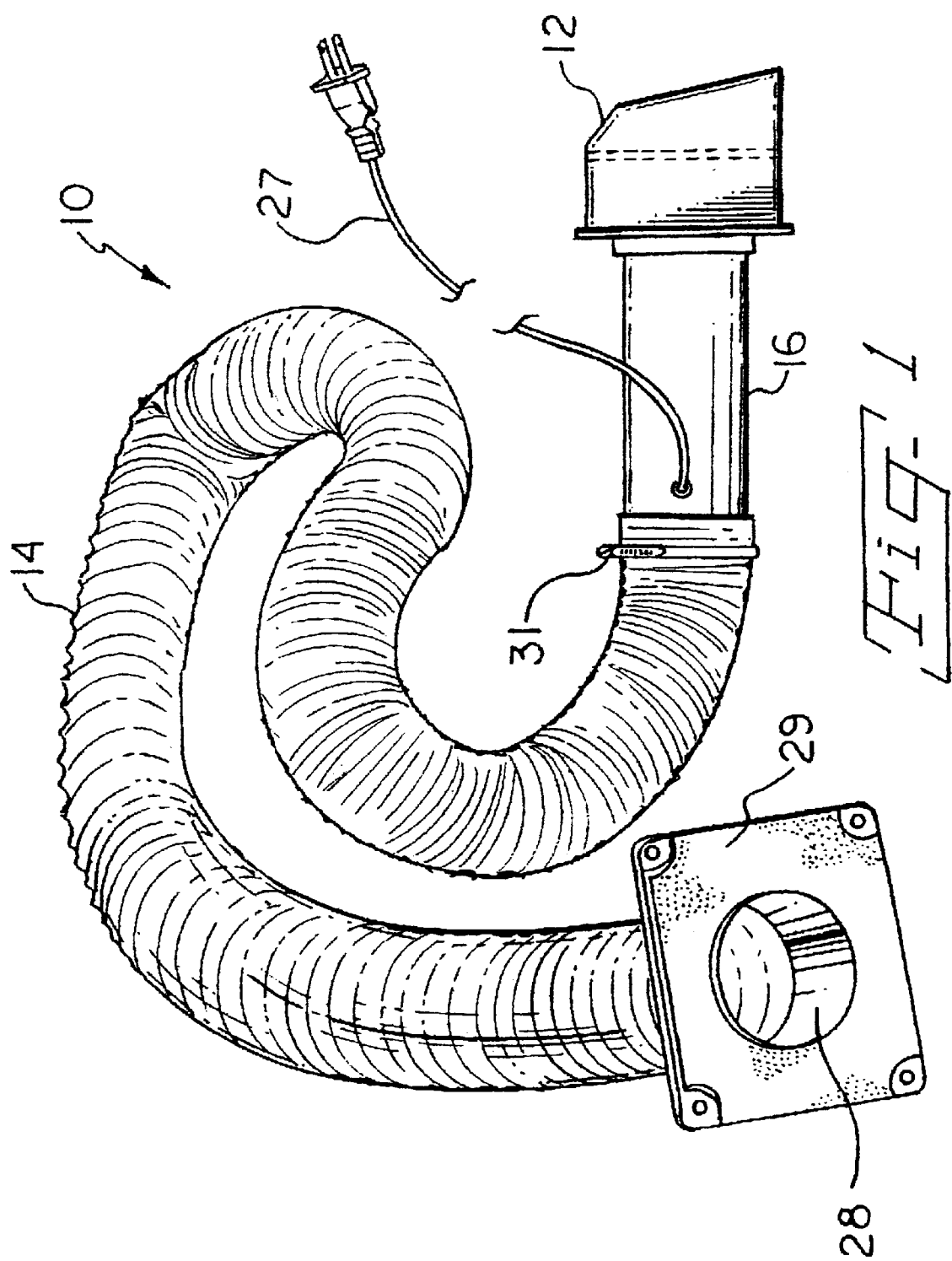
FIG. 1 is a perspective view of the disclosed kit, assembled for use.

The purpose of the disclosed kit for mitigating the level of radon in a dwelling is to achieve levels of radon that are deemed safe for the inhabitants. In certain areas, radon is highly concentrated in the soil and ground water. When a dwelling is constructed in an area of high radon concentration, radon, being a gas, will seep through the slab, crawl-space, or basement floor and accumulate in the dwelling. This accumulation presents concerns for the health and well-being of the occupants. The disclosed kit and method can often use a collection pit that is pre-existent in most dwellings, especially in dwellings located in high radon areas of the country, The pre-existing pit is typically referred to as the sump pit or sump crock area of the dwelling.

Sump crocks 33 are generally situated in a corner and below the foundation 35 of the dwelling. Typically there are perimeter drain lines 41 placed along both sides of the footer or foundation 35 of the dwelling. These drain lines collect storm and ground water that will accumulate under the slab 43, along the walls and under the floor of a basement. This accumulation of water into the drain tiles in the perimeter drain system, and ultimately into a sump pit 33 where it is expelled by a sump pump, will reduce the hydrostatic pressure on the underside of the slab or floor and on the walls of the basement. And, in the process of draining the water from the exterior subterranean surfaces of the dwelling, the drain tiles and sump pit will also be accumulating ambient radon. Therefore, the sump pit 33 or drain tile becomes a repository for excess radon and thereby provides an easy opportunity for the disclosed invention to remove the radon from an existing de-pressurization point 33 from which to mitigate excessive levels or radon in the dwelling.

This sump installation will be the least expensive option in most cases because the de-pressurization point already exists. Other optional suction or de-pressurization points will add minor cost increases; yet, the major expense of routing the pipe through the dwelling is still eliminated.

When installed correctly, the disclosed kit draws radon gas out through the de-pressurization point by way of the flex-duct which is attached to the integrally designed exterior axial fan/vent hood combination and exhausts the radon-enriched air trough the band-board or exterior wall of the dwelling. The radon level typically dilutes to a safe level within a few feet of the louver in the hood; however, the discharge should be at least 10 feet away from any doors, opened windows, decks, patios, porches or inhabited areas.

A complete understanding of the disclosed kit and its intended use is afforded by reference to the drawing. FIG. 1 depicts the disclosed kit 10 fully assembled. The essential components of the kit include the vent hood 12, the suction pipe 16, and the flex-duct 14. Also depicted in FIG. 1 is the power cord 27 for operating the axial fan, a mundane hose clamp 31 for securing the attachment of the flex-duct to the suction pipe and the sump pump lid coupler 28 for attaching the flex-duct to a sump pump lid and a gasket 29 to ensure a snug fit between the flex-duct and the sump lid.

Figure 2:
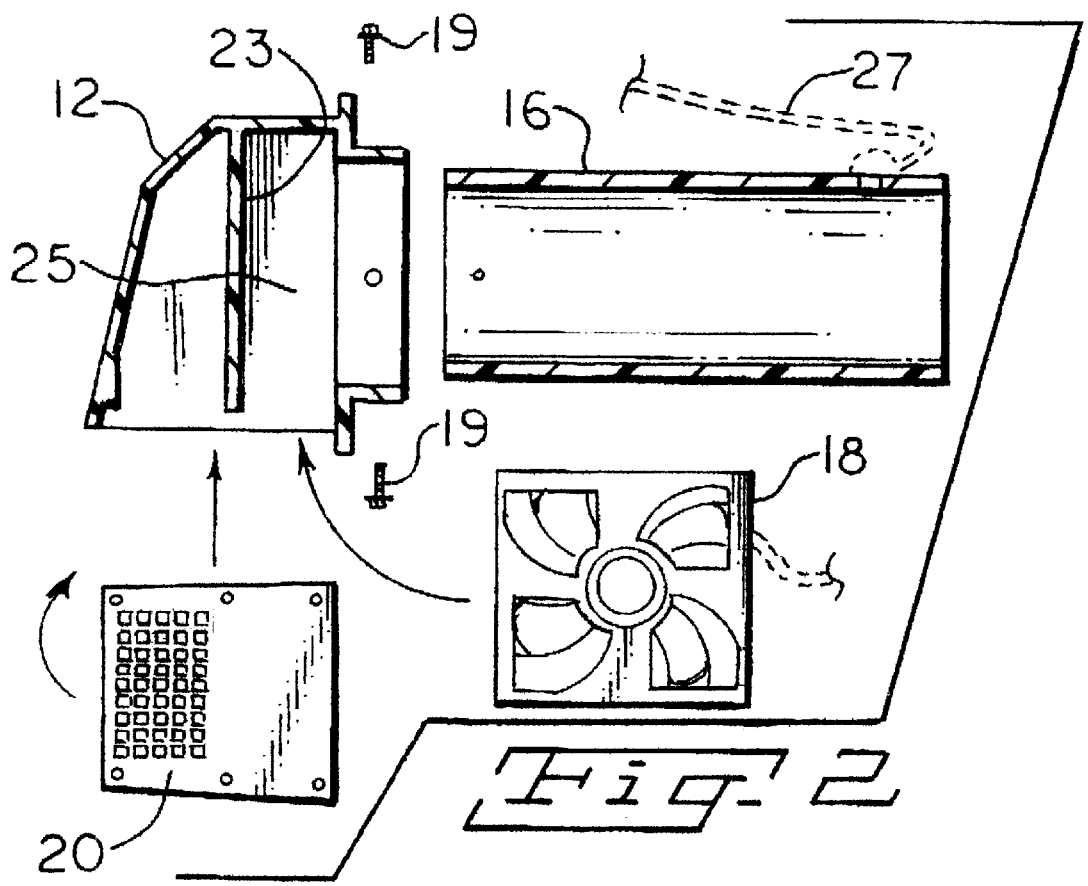
FIG. 2 is a sectional exploded view of the gas exit of the disclosed mitigation system, including the fan, which is hidden in FIG. 1.

FIG. 2 provides a disassembled view of a preferred embodiment of the vent hood 12, suction pipe 16 and an axial fan 18. When assembled the vent hood will extend to the exterior of the dwelling. The hood will house the axial fan 18 in a space 25 designed to hold the fan in an orientation perpendicular to the suction pipe 16. The fan, of course, when activated, will generate a negative pressure causing air in the suction pipe to flow into the vent hood and outside the dwelling. In the depiction of FIG. 2, the fan, when positioned in space 25 will be held in place by retention rib 23 and grill plate 20. The grill plate will also prevent foreign items from entering the vent hood and will permit the exhaust of pressurized air from the mitigation system 10.

As mentioned, the vent hood 12 is to be located on the exterior of the dwelling and attached to the external end of the suction pipe 16 using traditional fasteners 19. The suction pipe is to be positioned in a hole of suitable size cut in the band-board of the dwelling. Typically, the band-board 30 is located between a foundation wall 36 and the superstructure 39 of the dwelling. The power cord 27 (shown in phantom) extends from a power source in the dwelling to the fan 18 located in the vent hood 12.

Figure 3:
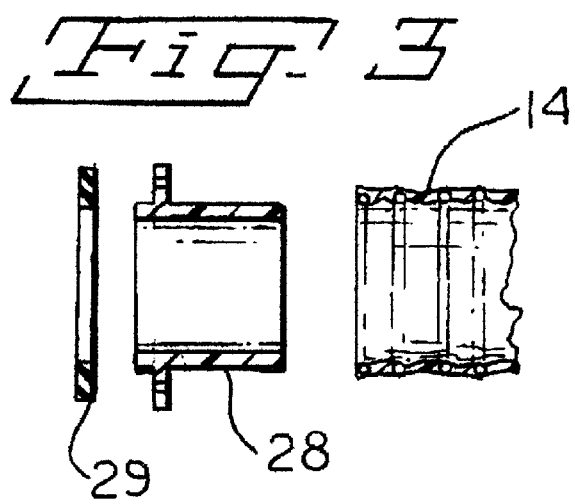
FIG. 3 depicts a disassembled view of a terminus of flex duct, a sump lid coupler and a gasket for providing an air-tight juncture between the disclosed kit and a de-pressurization point. The sump lid coupler and gasket are shown in cross section.
Figure 4:
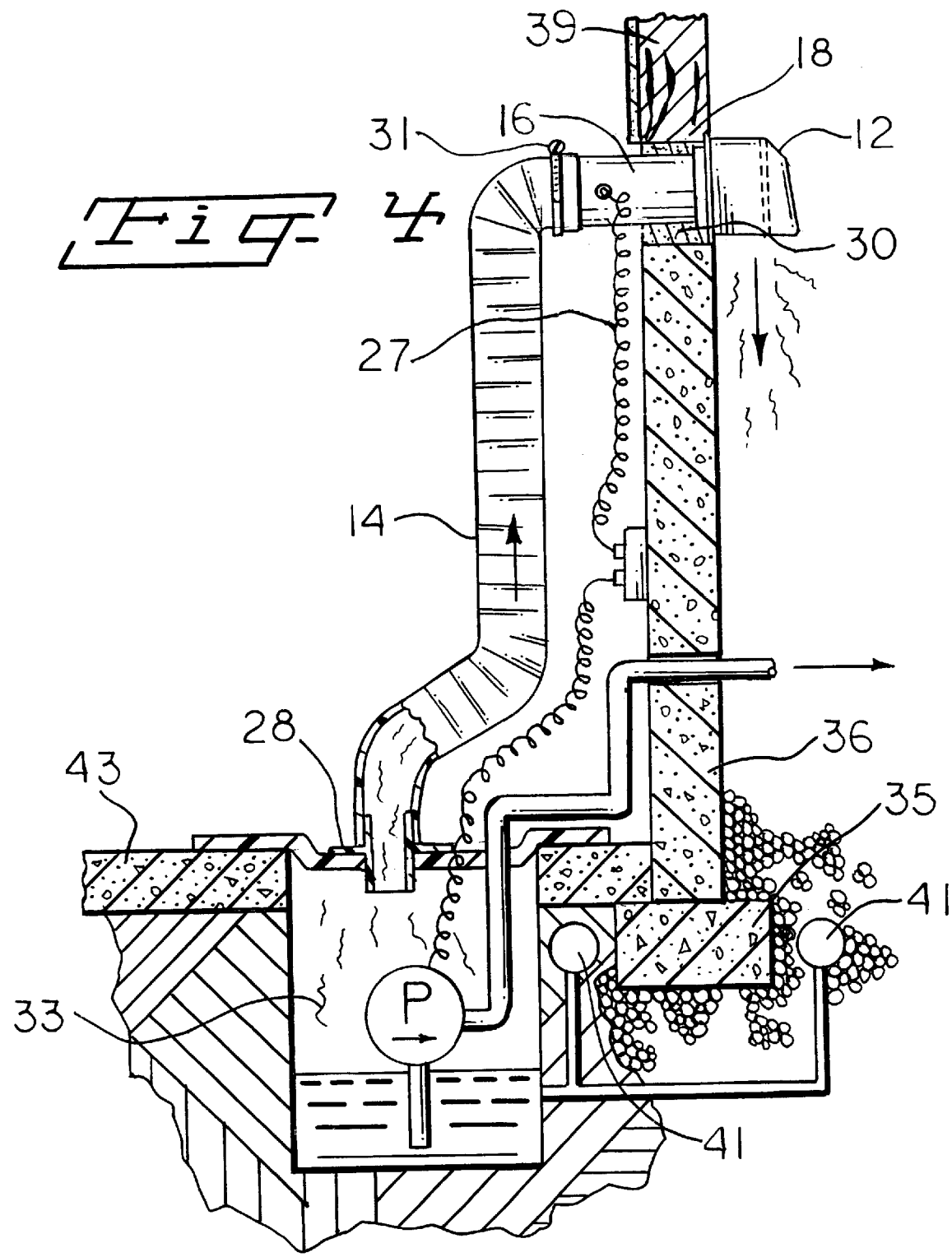
FIG. 4 is a schematic depiction, in partial cross section, showing the disclosed kit installed in a dwelling for use in radon mitigation.

FIG. 3, depicts the elements of the mitigation system 10 at the distal end of the flex-duct. More particularly, FIG. 3 shows a section of flex-duct 14 in line to be connected with a sump lid coupler 28 and gasket 29. The coupler and gasket are intended to mate with a hole in the typical sump well lid to ensure a secure and snug fit with the point of de-pressurization.

In summary, then, the preferred embodiments of the disclosed invention include inexpensive kits featuring a newly designed rain-proof exhaust fan hood holding a common axial fan and attached to flex-duct. The interior of the vent hood is molded to receive the fan by sliding the fan in through the underside. The fan is held in place by the combination of a grill and fan retainer located at the bottom of the vent hood, under the fan. The installer simply makes a hole in the band-board atop the foundation wall, inserts the kit and places the distal end of the attached flex duct into a sump crock, sub-slab block wall or crawl-space membrane de-pressurization point. Often an existing sump crock or existing drain tile is already available to serve as a de-pressurization point, making the kit very easy for a homeowner or handyman to install. This kit can also be used as a sump ventilator, an exhaust fan, and a booster fan moving air between rooms. There are no holes required in the floor, ceilings or roof and no pipes throughout the dwelling to hide or cover up. This system is simply an affordable kit that can be quickly and easily installed to provide ventilation for the mitigation of radon from a dwelling or used for any of the other below-mentioned purposes. For instance, the kit can also be used to vent unwanted odors or gasses present in the soil and/or ground water from naturally occurring bacteria or pollutants such as pesticides, herbicides, fertilizers and the like. The kit can also be used as an attic ventilator, bathroom exhaust, barn ventilator, industrial fume ventilator, a booster fan and in most any other application requiring air movement or removal. The added benefits of using a computer-cooling-type fan include a reduction of costs and space requirements and an increase in the life expectancy of the installation.

While the foregoing is a complete and detailed description of the preferred embodiments of the disclosed kit and system for radon mitigation, numerous variations and modifications may be employed to implement the all-important purpose of the kit and system without departing from the spirit of this invention; and therefore, the elaboration provided should not be assumed to limit, in any way, the scope of the invention, which is fairly defined by the appended claims.

What is claimed is:

1. A kit for the mitigation of radon from a dwelling having a de-pressurization point, said kit comprising: a suction pipe having interior and exterior openings relative to said dwelling; an exhaust vent hood attached to said pipe near the exterior opening to shield said opening, said hood housing an axial fan; a length of flex-duct sufficient to extend from the interior opening of said suction pipe to the de-pressurization point; and a coupler and gasket for ensuring a secure fit between said flex-duct and said de-pressurization point.

2. A method for the mitigation of radon in a dwelling having elevated radon levels, said dwelling having a subterranean foundation with a de-pressurization point and a band-board juncture between the foundation and the superstructure of said dwelling, said method comprising:

boring a hole in said band-board;

inserting in said hole a suction pipe having interior and exterior openings, relative to said dwelling;

attaching an exhaust vent hood to the exterior opening of said pipe to shield said opening, said hood housing an axial fan; and connecting to the interior opening of said pipe, a length of flex-duct sufficient to extend to the de-pressurization point in the dwelling.

* * * * *